United States Patent
David

(10) Patent No.: US 6,538,599 B1
(45) Date of Patent: Mar. 25, 2003

(54) NONCOHERENT GAIN ENHANCEMENT TECHNIQUE FOR NON-STATIONARY TARGETS

(75) Inventor: George Thomas David, deceased, late of Oro Valley, AZ (US), by Judith L. David, executrix

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/992,459

(22) Filed: Nov. 16, 2001

(51) Int. Cl.$^7$ .............................................. G01S 13/52
(52) U.S. Cl. ..................... 342/196; 342/95; 342/104; 342/106
(58) Field of Search ................ 342/93, 95, 96–97, 342/101, 106, 113, 115, 194–196, 159, 162

(56) References Cited

U.S. PATENT DOCUMENTS

| | | | |
|---|---|---|---|
| 4,148,029 A | * 4/1979 | Quesinberry | 342/106 |
| 5,325,098 A | * 6/1994 | Blair et al. | 342/101 |
| 5,416,488 A | * 5/1995 | Grover et al. | 342/109 |
| 5,644,508 A | * 7/1997 | McNary et al. | 342/159 |
| 5,663,720 A | * 9/1997 | Weissman | 340/934 |
| 6,018,311 A | 1/2000 | David | |

FOREIGN PATENT DOCUMENTS

GB  2141302 A * 12/1984  ........... G01S/13/52

OTHER PUBLICATIONS

"An Edge Based Visual Tracking for Target within Complex Environment" by En–Wei Huang, Wei–Guan Yau and Li–Chen Fu, Proceedings of the American Control Conference, Chicago, Illinois Jun. 2000.*

"Estimation of Trajectories for Accelerated Motion from Time–Varying Imagery" by Michel Chahine, and Janusz Konrad, 1994 IEEE.*

* cited by examiner

Primary Examiner—Thomas H. Tarcza
Assistant Examiner—Isam Alsomiri
(74) Attorney, Agent, or Firm—Renner, Otto, Boisselle & Sklar, LLP

(57) ABSTRACT

A radar system and radar processing method includes a number of aspects for providing improved function. The system and method may employ one or more of the following aspects: timely range-velocity (range-Doppler) compensation for target nonstationarity by integration along hypothesized range-Doppler trajectories, allowing noncoherent integration over an elongated time interval; noncoherent integration of an enlarged signal set obtained from overlapped coherent processing intervals (CPIs); hypothesized joint multiple accelerations used to generate multiple hypothesized range-Doppler trajectories; and sliding window integration to increase data output rates with use of large noncoherent integration intervals (NCIs). These aspects allow for improved signal-to-noise ratios, for acquisition and tracking of targets at longer ranges, and for improved target parameter estimation.

41 Claims, 3 Drawing Sheets

NONCOHERENT GAIN ENHANCEMENT TECHNIQUE FOR NON-STATIONARY TARGETS

TECHNICAL FIELD OF THE INVENTION

This invention relates to active and semiactive radars, and more particularly to radar-receiver signal processors matched to coherently pulsed radar signals in a moving-target environment, and more particularly to techniques for providing enhanced signal-processing gains in such signal processors.

BACKGROUND OF THE INVENTION

Active and/or semiactive radar-receiver signal processors can be "matched" to coherently pulsed radar signals in a moving-target engagement. This type of processor typically updates hypothesized own-ship/target differential-Doppler compensation (range-rate aiding) at a coherent processing interval (CPI) rate to develop a detection statistic via simple zero-order noncoherent post detection integration (PDI). This CPI-rate compensation of hypothesized differential own-ship/target Doppler prohibits the application of overlapped-CPI noncoherent PDI processing, since desired-signal coherence within the overlapped observation intervals will be destroyed.

SUMMARY OF THE INVENTION

A Noncoherent Gain Enhancement (NGE) algorithm technique, in accordance with an aspect of the invention, implements noncoherent integration, over one or more hypothesized range-Doppler trajectories, of an enlarged signal set obtained by integration over a longer time interval, and/or from using overlapped coherent processing intervals (CPIs). Multiple hypothesized target accelerations may be employed, which may be constant or may be time-varying, for example corresponding to a hypothesized target maneuver, such as a turning maneuver. The use of multiple hypothesized target accelerations allows the integration over a longer time interval. This technique of noncoherent integration provides a significant improvement, over conventional radar processing, in target detection and target-parameter estimation. The NGE algorithm provides, over the same observation (PDI) interval, noncoherent integration of a much larger number of coherently processed signals to effect greater signal processing gains. This is in addition to the integration over a longer time interval (the elongated PDI interval), which as noted above may employed because of the use of multiple hypothesized range-Doppler trajectories that may involve multiple hypothesized target accelerations. Sliding window integration may be employed to allow generation of output data at smaller time intervals than the elongated PDI interval.

According to an aspect of the invention, a method of processing data in a sensor system that received signal returns from pulsed coherent transmitted signals, includes forming a plurality of range-Doppler maps; and noncoherently integrating the results of the range-Doppler maps along a hypothesized range-velocity trajectory that is a function of a hypothesized acceleration, thereby producing combined range-Doppler results.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWING

In the annexed drawings,

FIGS. 2 and 3 are time diagrams illustrating operation of the radar system in accordance with the invention, wherein FIG. 2 illustrates 50% overlapping of the CPI data frames, and FIG. 3 illustrates 75% overlapping of the CPI data frames;

DETAILED DESCRIPTION

A radar system and radar processing method includes a number of aspects for providing improved function. The system and method may employ one or more of the following aspects: timely range-velocity (range-Doppler) compensation for target nonstationarity by integration along hypothesized range-Doppler trajectories, allowing noncoherent integration over an elongated time interval; noncoherent integration of an enlarged signal set obtained from overlapped coherent processing intervals (CPIs); hypothesized joint multiple accelerations used to generate multiple hypothesized range-Doppler trajectories; and sliding window integration to increase data output rates with use of large noncoherent integration intervals (NCIs). These aspects allow for improved signal-to-noise ratios, for acquisition and tracking of targets at longer ranges, and for improved target parameter estimation.

Figure 1:
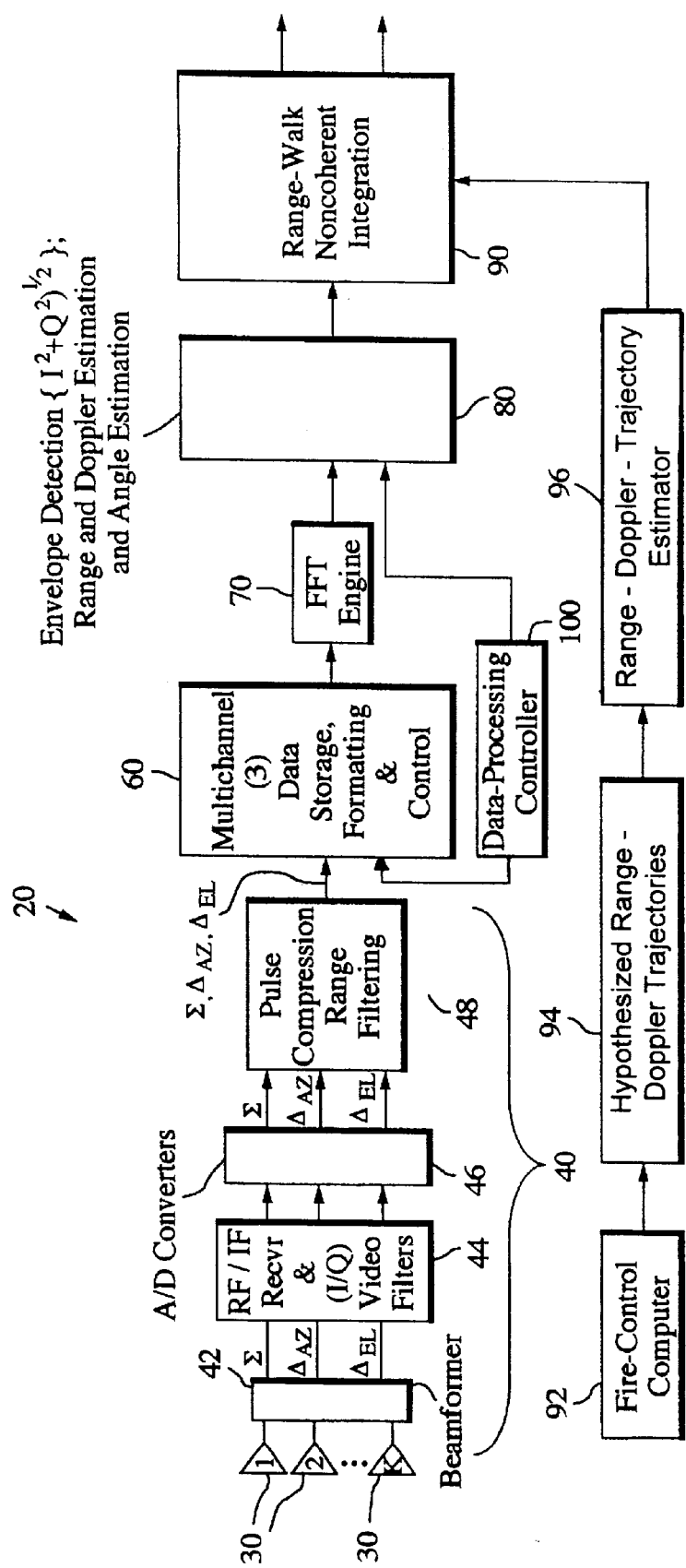
FIG. 1 is a schematic block diagram of an exemplary radar system employing the present invention.

FIG. 1 is a schematic block diagram of an exemplary radar system 20 employing the present invention. The system includes K antenna elements or subarrays 30, and a radar receiver/signal processor 40. The receiver/processor includes a beamformer 42 which forms a sum beam signal ($\Sigma$) and azimuth and elevation difference beam signals ($\Delta_{AZ}$ and $\Delta_{EI}$). These signals are input at RF frequencies to the RF/IF receiver 44, which downconverts these beam signals to video signal frequencies, and passes the downconverted signals through in-phase/quadrature (I/Q) video filters. The video signals from the receiver 44 are converted to digital form by the analog-to-digital (A/D) converters 46. The digitized signals are then processed by pulse compression range filtering 48, to provide, in digital form, the processed sum and difference channel radar signals ($\Sigma$, $\Delta_{AZ}$, and $\Delta_{EI}$).

It is assumed, for this exemplary embodiment, that the transmitted signal (and therefore, the received target signal) is a coded (e.g., binary phase-coded) signal of pulse length T and amplitude A (to provide illumination of a target with a high-energy waveform, $E=A^2T/2$). Upon reception, the binary phase-coded signal T seconds long is compressed via replica correlation to provide a compressed pulse of pulse width $T_C=\alpha T$, and amplitude $A_C=A/\alpha$; a representative binary phase code might correspond to a Barker sequence of length 13, so that $T_C=T/13$ and $A_C=13A$. This waveform permits "effective illumination" of a target with a waveform that, upon compression in the receiver, appears to have been obtained from a higher-amplitude pulse (13A) of compressed pulse length T/13, also providing enhanced range resolution.

The radar system 20 further includes a multichannel (three in this embodiment) data storage, formatting and control apparatus 60. The three channels of data provided by the apparatus 60 are provided to a Fast Fourier Transform (FFT) engine 70 for FFT processing. The FFT-processed data are then processed by envelope detection $((I_2+Q^2)^{1/2})$ and/or monopulse-ratio discriminant processor 80. Functions performed by the FFT engine 70 and processor 80 are conventional radar-processing functions.

The engine 70 and processor 80 produce a number of range-Doppler maps corresponding to a post detection interval (PDI). The term "range-Doppler map," as used herein, is to be understood as widely embracing arrangements of data into arrays or other data structures that allow examination of signal strength (or a parameter derived from signal strength) as a function of target range and Doppler (velocity). The range-Doppler maps may be expressed or expressible as a series of signal strengths (or related parameters) corresponding to respective range-Doppler bin combinations. For example, a range-Doppler map may involve 100 range bins (each corresponding to a segment of range values) and 128 Doppler bins (each corresponding to a segment of velocity values). The range-Doppler map may be other than a map or plot in any traditional sense, but may involve storage of data values corresponding to signal strengths for each combination of range bin and Doppler bin.

The range-Doppler maps may be made by well-known methods. For example, individual pulse radar returns may each be divided into range bins, with a signal strength corresponding to each of the range bins. The returns may then be stacked to make a two-dimensional matrix, with range bins for consecutive returns aligned. The Doppler data is discretized into a number of Doppler bins, each corresponding to a bounded velocity segment, by an FFT process is then performed across corresponding range bins of the returns, thus providing velocity (Doppler) data corresponding to the bins.

The range-Doppler map data provided by processor 80 are then processed by a range-Doppler-walk noncoherent integration (NCI) processor 90. A computer 92 in this exemplary embodiment provides one or more hypothesized range-Doppler trajectories 94 to a range-Doppler-trajectory-walk estimator 96. In doing so, the computer 92 may select one or more hypothesized accelerations. As explained in greater detail below, the hypothesized accelerations may be selected in any of a variety of suitable ways. Based on a hypothesized (cued) range-rate estimate and a hypothesized Doppler-rate estimate, the estimator 96 determines the number of range-Doppler combinations that the target will traverse over the PDI interval and the number of overlapped-CPI-processed parameters available for noncoherent integration within each range-Doppler combination associated with the hypothesized target range-Doppler trajectory.

The NCI processor 90 provides as output data regarding the range and velocity (Doppler) of the acquired target. For example, the output data may include a Constant False-Alarm Rate (CFAR) detection statistic from the sum channel to provide initial range/Doppler estimates, and parameter estimates such as range/Doppler/angle estimates, from the sum and difference channels.

Figure 2:
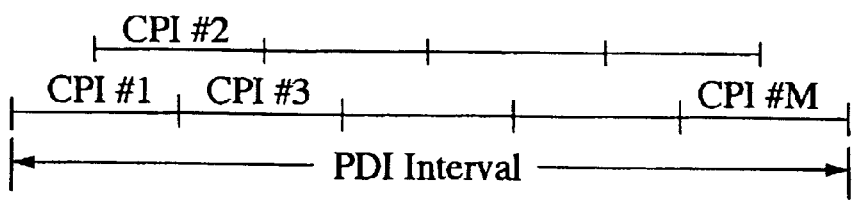
Figure 3:
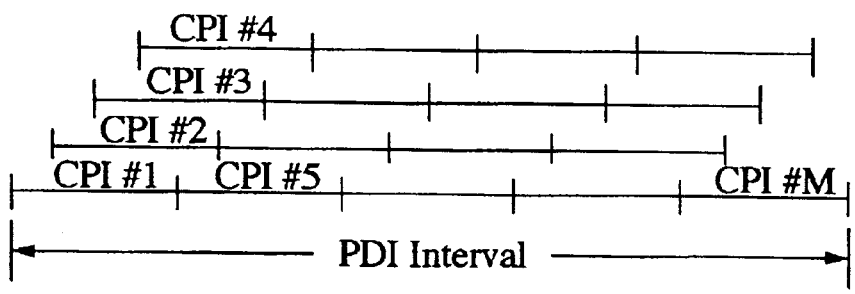

Possible configurations of the overlapping of the CPI data frames are illustrated in the time diagrams of FIGS. 2 and 3. FIG. 2 illustrates 50% overlapping of the CPI data frames, and FIG. 3 illustrates 75% overlapping of the CPI data frames. With range-rate and Doppler-rate compensation applied at a PDI-interval rate or at a faster rate (allowing multiple compensations within an elongated PDI), overlapped CPI data frames within the PDI interval are successively subjected to DFT/FFT processing. This overlapping is possible, since desired-signal coherence is maintained within the overlapped intervals due to the range-rate and Doppler-rate compensation being applied not much more frequently than at a PDI-interval rate. Further information regarding overlapping may be found in U.S. Pat. No. 6,018,311, which is herein incorporated by reference in its entirety.

In contrast, conventional radar signal processors that implement noncoherent integration of sequential CPI-rate data may apply range-rate updates, i.e., range delays or advances, to a sequence of nonoverlapping CPIs to "compensate" for opening or closing range rates, respectively. As an illustration of this process, consider a Mach-2 closing engagement and a PRF of 25 kHz. Over one CPI (e.g. 128 PRIs), the target-to-radar range will close by 3.4 meters. This range closure will require an average range advance (increase) of 3.4 meters (about 5.12 milliseconds) applied, sequentially, to each of the following nonoverlapping QPIs within the PDI interval, so that target data will reside within the same range sample over the sequence of CPIs within the PDI interval. Thus the appropriate processed parameters (e.g., detection statistic, range, Doppler and angle estimates) can be noncoherently integrated, via zero-order filters, to achieve further processing gains. This discretizes the range as the range passes boundaries of the range bins ("gates"). The distance between successive range boundaries is termed the gate size. These inter-CPI range advances destroy inter-CPI signal coherence, thereby precluding the application of "effective" overlapped-CPI processing.

As illustrated in FIG. 2, if N corresponds to the number of contiguous, i.e., non-overlapping, CPI data sequences or data frames available within the PDI interval, then, with 50% overlapping, the number of overlapped CPI sequences within the same PDI interval is given by M=2N−1. Similarly, the corresponding number for 75% overlapping is given by M=4N−3, and the 75% overlapping is shown in FIG. 3. The practical number for M is limited by the temporal correlation exhibited by the interference signal (e.g., receiver noise) between adjacent CPI sequences.

Figure 4:
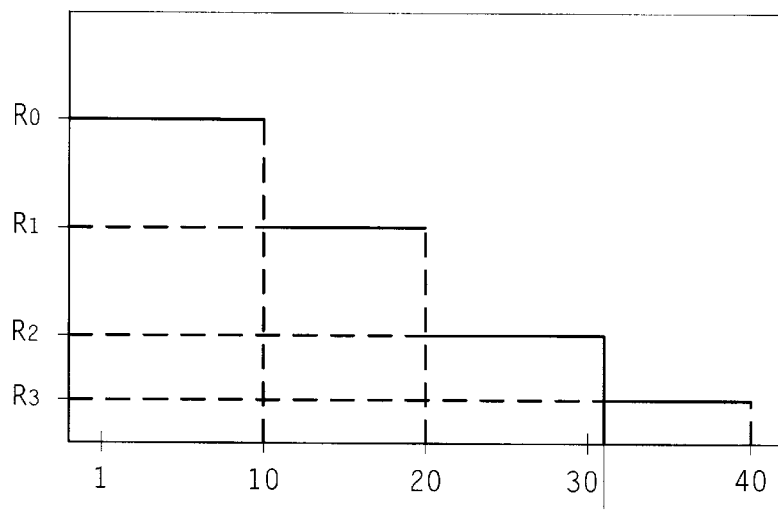
FIG. 4 is a plot of the range closure as a function of the CPI number over a PDI interval.
Figure 5:
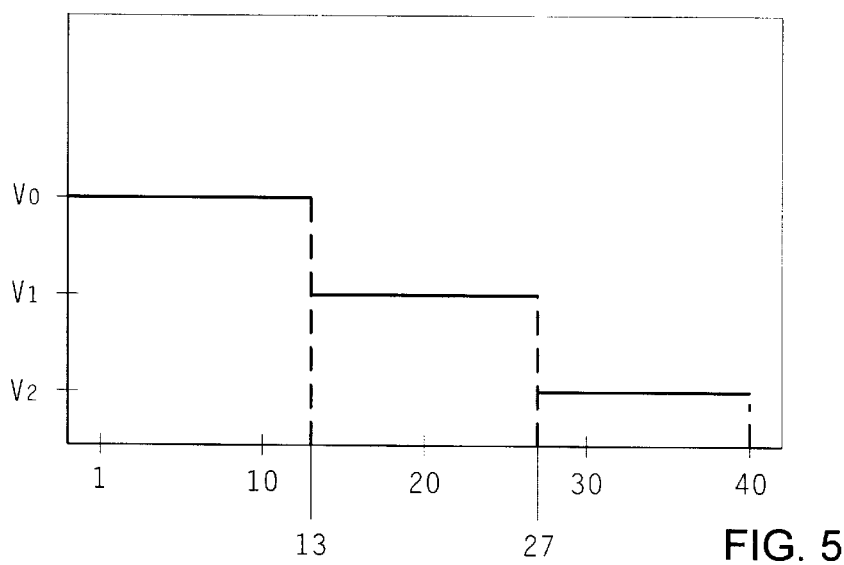
FIG. 5 is a plot of the Doppler (velocity) as a function of the CPI number over a PDI interval.

Although reducing the update rate of hypothesized (cued) differential Doppler compensation (range-rate-aiding) to coincide with the PDI interval permits effective coherent processing within each overlapped-CPI interval, noncoherent integration would be suboptimum using traditional zero-order integration over the entire PDI interval if the range trajectory occupies more than one range gate. Optimization of the noncoherent integration (NCI) process is readily achieved by applying a combination of integration filters (accumulators) over the hypothesized range-Doppler trajectory. These filters are implemented in the noncoherent integration processor 90 in this exemplary embodiment. An example of an NCI range-Doppler trajectory is illustrated in FIGS. 4 and 5, which plot the range closure and closure velocity, respectively, as functions of the CPI number over the PDI interval, where the hypothesized initial differential Doppler is assumed to be Mach 2 and wherein there is a hypothesized positive differential acceleration (toward the radar system 20). In this representative scenario, the PRF is 25 KHz, the CPI is 128/PRF, the PDI ratio is 10:1, the CPI overlap is 75%, the range gate is about 20 meters, the sampling interval is on the order of 10 meters, and the Doppler gate is about 3 meters/second for X-band radar. 50% overlapped range gates, providing 10-meter effective range-gate separation, are formed to reduce range-gate straddle loss during range-walk trajectories. In the following discussion, the outputs of these 50% overlapped range-gates are identified as range samples.

Figure 6:
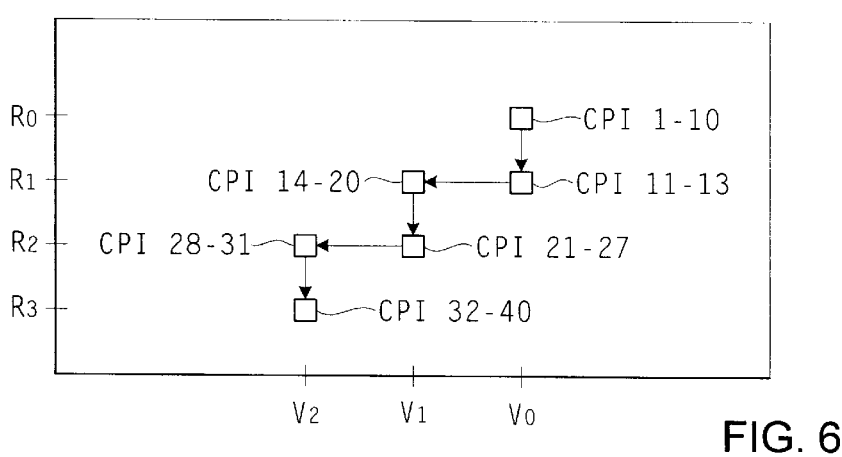
FIG. 6 is a plot of a range-Doppler trajectory using the range and Doppler plots of FIGS. 4 and 5.

FIG. 4 demonstrates that the range-rate update at the PDI rate requires noncoherent integration traversal over four contiguous range bins or samples (four consecutive 50%-overlapped range gates), i.e., that noncoherent integration is accomplished over four contiguous range bins or samples. FIG. 5 shows that the noncoherent integration traverses three contiguous Doppler bins or samples. FIG. 6 shows the range-Doppler bin combinations during the PDI, with the corresponding CPIs for each combination. In the example of FIGS. 4–6, the target begins at range bin $R_0$ and Doppler $V_0$. Thus the range-Doppler combination is $R_0$–$V_0$. After a time corresponding to 10 overlapping (OL) CPIs, target exits range bin $R_0$ and enters range bin $R_1$, thus shifting the range-Doppler combination to $R_1$–$V_0$. Following an additional 3 OL CPIs (OL CPIs 11–13), the target exits $V_0$ and enters $V_1$, shifting the range-Doppler combination to $R_1$–$V_1$. The target then shifts during the PDI through combinations $R_1$–$V_2$, $R_2$–$V_2$, and $R_2$–$V_3$, after different numbers of CPIs. The noncoherent integration may be readily accomplished by a contiguous set of piecewise zero-order integration filters that are accumulated over the hypothesized range-Doppler trajectory shown in FIG. 6.

The range-Doppler maps thus may be noncoherently integrated along a hypothesized range-Doppler trajectory, such as the range-Doppler trajectory illustrated in FIGS. 4–6 and described above. That is, the signal strengths of the corresponding range-Doppler bins of the range-Doppler maps are not simply summed, as is conventional. Rather, .there is a shift in the summation (integration) process, following the shifts in range-Doppler combination along the hypothesized range-Doppler trajectory. Thus the hypothesized range-Doppler trajectory is used as a hypothesized integration path for integrating the range-Doppler maps.

Although the above discussion is directed toward one-dimensional target movements (ranges, velocities, and accelerations), it will be appreciated that the above-described method may be generalized to two- or three-dimensional movements, with suitable modifications. The multi-dimensional movements may be represented in a variety of suitable coordinate systems.

Only one range-Doppler trajectory is illustrated in FIGS. 4–6. Normally, there would be some uncertainty expected in the hypothetical acceleration utilized in determining the range-Doppler trajectory. Therefore multiple hypothetical accelerations may be utilized to generate multiple hypothesized range-Doppler trajectories, with each of the range-Doppler trajectories utilized in a noncoherent integration of the range-Doppler maps.

The multiple hypothetical accelerations may be selected by any of a variety of suitable methods. For example, an interval of possible accelerations may be fixed as the possible range of relative accelerations between the target and the system. The hypothetical accelerations may be selected by evenly dividing the interval of possible accelerations. Alternatively, an interval of hypothesized accelerations may be selected based an acceleration determined from a previous integration. As another possible alternative, information about prior movements of the target, and/or about movements of the radar system, may be utilized in determining an interval of accelerations from which the hypothesized accelerations may be selected. It will be appreciated that many other suitable factors may be taken into account in determining the hypothesized accelerations.

The hypothesized accelerations may be constant throughout the PDI. Alternatively, the hypothesized accelerations may be time varying. For example, the hypothesized target acceleration may correspond to that needed for a turning maneuver or other hypothesized maneuver. Variation in the hypothesized acceleration may be a function of other parameters. For example, a variation in hypothesized acceleration may be triggered by a change in proximity of the system and the target.

It will be further appreciated that multiple integration paths may also be employed which involve variations in hypothesized initial velocity (Doppler).

When multiple integration paths (range-Doppler trajectories) are employed, a determination must be made as to which noncoherent integration result to utilize in providing information regarding the target (such as range, velocity, and/or acceleration) and in tracking the target. The determination may be made by use of any of a variety of well-known constant false alarm rate (CFAR) detection statistics or algorithms. Alternatively, the determination may be a selection of the integration path that produces the strongest maximum signal (highest signal value) in any range-Doppler bin. It will be appreciated that other suitable methods of treating the results may be employed, for example in using other criteria to select one or noncoherent integration results, which may be suitably combined with one another.

Integration over range-Doppler trajectories generated with multiple acceleration hypotheses, such as is described above, advantageously allows noncoherent integration over longer intervals. For example, noncoherent integration may occur over time periods 10 to 20 times as long as in conventional processing methods, such time periods for example being one second or larger. Conventional uncompensated or range-compensation-only processing methods do not allow for integration over such long time periods, because changes in range and Doppler during the time period may lead to unsatisfactory results. In contrast, use of such long integration time in the present invention makes for improvements in target tracking and signal-to-noise ratio.

In integrating over a long time period, it will be appreciated that it may be advantageous to employ a sliding window approach, using data from each CPI multiple times in order to maintain an output data rate suitable for tracking the target. In essence an integration "window" is advanced by a number of CPIs less than the PDI ratio over which the noncoherent integration is performed. For example, in a conventional system with a PDI ratio of 20, CPIs 1–20 would be used to generate first output data at a first time, CPIs 21–40 used to generate second output data at a second (later) time, CPIs 41–60 used to generate third output data at a third time, and so on. For a system, such as that described above, that uses integration over a longer time period, for example 200 CPIs, CPIs 1–200 may be used to generate first output data at a first time. The integration window may then be shifted by 20 CPIs, allowing second output data to be generated at a second time from CPIs 21–220. CPIs 41–240 would be used to generate third output data at third time. Thus the same output data rate may be maintained, even with an increase in the amount of data used to generate each chunk of output data. In doing so each piece of input data (the data corresponding to each CPI, for example) is used multiple times. In the above example, each CPI of data would be used ten times.

Predictions of exemplary performance enhancement for a system such as described above may be 6–10 dB for detection and 10–14 dB for estimation.

The above-described system and method may be applied to missile radar seekers, and other radar signal processors to achieve available signal-processing gains. This increased signal-processing gain may be achieved with a substantially reduced increase in radar-seeker hardware relative to that required for comparable gains that may be achieved via increased transmitter power.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of processing data in a sensor system that receives signal returns from pulsed coherent transmitted signals, the method comprising:
    forming a plurality of range-Doppler maps; and
    noncoherently integrating the results of the range-Doppler maps along a hypothesized range-velocity trajectory that is a function of a hypothesized acceleration, thereby producing combined range-Doppler results.

2. The method of claim 1, wherein the hypothesized acceleration is a hypothesized target acceleration.

3. The method of claim 1, wherein the forming the range-Doppler maps includes:
    range filtering the received signal returns to produce range-filtered data;
    formatting the range-filtered data of a post detection integration interval into a plurality of data sequences;
    performing Fast Fourier Transform (FFT) processing on the data sequences to provide transformed data sequences; and
    producing the range-Doppler maps from the transformed data sequences.

4. The method of claim 3, wherein the formatting the range-filtered data includes formatting the data into a plurality of overlapping coherent processing interval (CPI) data sequences.

5. The method of claim 4, wherein the plurality of overlapping CPI data sequences are overlapped by a 50% overlap rate.

6. The method of claim 4, wherein the plurality of overlapping CPI data sequences are overlapped by a 75% overlap rate.

7. The method of claim 1, wherein the hypothesized range-velocity trajectory is also a function of a hypothesized velocity.

8. The method of claim 7, further comprising, prior to the noncoherently integrating, selecting the hypothesized initial velocity from one or more of the range-Doppler maps.

9. The method of claim 1, wherein the hypothesized range-velocity trajectory is also a function of a hypothesized initial range of the target object.

10. The method of claim 9, further comprising, prior to the noncoherently integrating, selecting the hypothesized initial range from one or more of the range-Doppler maps.

11. A method of processing data in a sensor system that received signal returns from pulsed coherent transmitted signals, the method comprising:
    forming a plurality of range-Doppler maps; and
    noncoherently integrating the results of the range-Doppler maps along a hypothesized range-velocity trajectory that is a function of a hypothesized acceleration, thereby producing combined range-Doppler results;
    wherein the noncoherently integrating Includes multiple noncoherent integrations, using a variety of different hypothesized accelerations, and thereby producing a plurality of integrated results, and further comprising selecting among the plurality of the integrated results.

12. The method of claim 11, wherein the selecting includes selecting the integrated result that has the highest magnitude in a range-Doppler bin.

13. The method of claim 11, wherein the noncoherently integrating further includes selecting the hypothesized accelerations from a predetermined acceleration range.

14. The method of claim 13, wherein the acceleration range is bounded by a predetermined maximum acceleration.

15. The method of claim 1, wherein the noncoherently integrating includes sliding window integrating, utilizing the range-Doppler maps in multiple integrations at multiple times.

16. The method of claim 1, wherein the hypothesized acceleration is a time-varying acceleration.

17. The method of claim 16, wherein the time-varying acceleration corresponds to a hypothesized target maneuver.

18. The method of claim 17, wherein the target maneuver includes a turning maneuver.

19. A method of processing data in a sensor system that receives signal returns from pulsed coherent transmitted signals, the method comprising:
    generating range-Doppler data from the signal returns;
    determining multiple hypothetical target range-velocity trajectories, wherein the trajectories utilize different hypothesized accelerations; and
    noncoherently integrating the range-Doppler data along the multiple hypothesized range-velocity trajectories, thereby producing multiple combined range-Doppler results.

20. The method of claim 19, further comprising selecting among the multiple range-Doppler results.

21. The method of claim 20, wherein the selecting includes evaluating the range-Doppler results using a constant false alarm rate detection algorithm.

22. The method of claim 19, wherein the determining further includes selecting the hypothesized accelerations from a predetermined acceleration range.

23. The method of claim 22, wherein the acceleration range is bounded by a predetermined maximum acceleration.

24. The method of claim 19, wherein the noncoherently integrating includes sliding window integrating of the range-Doppler data in multiple integrations at multiple times.

25. The method of claim 19, wherein the hypothesized accelerations include time-varying accelerations.

26. The method of claim 25, wherein at least some of the time-varying accelerations correspond to one or more hypothesized target maneuvers.

27. The method of claim 26, wherein the one or more target maneuvers includes a turning maneuver.

28. A method of processing data in a sensor system that receives signal returns from pulsed coherent transmitted signals reflected by a target, the method comprising:

generating range-Doppler data from the signal returns;

determining multiple hypothetical target range-velocity trajectories;

noncoherently integrating the range-Doppler data along the multiple hypothesized range-velocity trajectories, thereby producing multiple combined range-Doppler results; and selecting among the multiple range-Doppler results for providing information regarding the target;

wherein the trajectories utilize different hypothesized accelerations;

wherein the hypothesized accelerations include time-varying accelerations; and wherein at least some of the time-varying accelerations correspond to one or more hypothesized target maneuvers of the target.

29. The method of claim 11, wherein the hypothesized accelerations includes hypothesized target accelerations.

30. The method of claim 11, wherein the forming the range-Doppler maps includes:

range filtering the received signal returns to produce range-filtered data;

formatting the range-filtered da(a of a post detection integration interval into a plurality of data sequences;

performing Fast Fourier Transform (FFT) processing on the data sequences to provide transformed data sequences; and producing the range-Doppler maps from the transformed data sequences.

31. The method of claim 30, wherein the formatting the range-filtered data includes formatting the data into a plurality of overlapping coherent processing interval (CPI) data sequences.

32. The method of claim 31, wherein the plurality of overlapping CPI data sequences are overlapped by a 50% overlap rate.

33. The method of claim 31, wherein the plurality of overlapping CPI data sequences are overlapped by a 75% overlap rate.

34. The method of claim 11, wherein the hypothesized range-velocity trajectory is also a function of a hypothesized velocity.

35. The method of claim 34, further comprising, prior to the noncoherently integrating, selecting the hypothesized initial velocity from one or more of the range-Doppler maps.

36. The method of claim 11, wherein the hypothesized range-velocity trajectory is also a function of a hypothesized initial range of the target object.

37. The method of claim 36, further comprising, prior to the noncoherently integrating, selecting the hypothesized initial range from one or more of the range-Doppler maps.

38. The method of claim 11, wherein the noncoherently integrating includes sliding window integrating, utilizing the range-Doppler maps in multiple integrations at multiple times.

39. The method of claim 11, wherein the hypothesized acceleration is a time-varying acceleration.

40. The method of claim 39, wherein the time-varying acceleration corresponds to a hypothesized target maneuver.

41. The method of claim 40, wherein the target maneuver includes a turning maneuver.

* * * * *

UNITED STATES PATENT AND TRADEMARK OFFICE
CERTIFICATE OF CORRECTION

PATENT NO.    : 6,538,599 B2                                       Page 1 of 1
DATED         : March 25, 2003
INVENTOR(S)   : George Thomas David It is certified that error appears in the above-identified patent and that said Letters Patent is hereby corrected as shown below:

<u>Column 1,</u>
Line 4, below the title, please insert -- This invention was made with Government support under Contract No. F08626-98-C-0027 awarded by the Department of the Air Force. The Government has certain rights in this invention. --.

Signed and Sealed this

Fourteenth Day of October, 2003

JAMES E. ROGAN
*Director of the United States Patent and Trademark Office*